(12) United States Patent
Homer et al.

(10) Patent No.: US 6,884,098 B2
(45) Date of Patent: Apr. 26, 2005

(54) COMPRESSED I/O CONNECTOR LAYOUT WITH SHARED POST

(75) Inventors: Steven S. Homer, Tomball, TX (US); Lee W. Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 09/818,284

(22) Filed: Mar. 27, 2001

(65) Prior Publication Data

US 2002/0141149 A1 Oct. 3, 2002

(51) Int. Cl.$^7$ .............................................. H01R 13/62
(52) U.S. Cl. ........................ 439/296; 439/302; 710/72
(58) Field of Search ............................... 710/7, 17, 29, 710/226, 1, 11, 12, 36, 62, 64, 73; 439/296, 302; 712/225, 229; 362/581; 365/439

(56) References Cited

U.S. PATENT DOCUMENTS

| | | | | |
|---|---|---|---|---|
| 5,038,308 A | * | 8/1991 | Le et al. .................... 364/708 |
| 5,174,293 A | * | 12/1992 | Hagiwara ................... 600/300 |
| 5,567,180 A | * | 10/1996 | Seo .............................. 439/638 |
| 5,596,169 A | * | 1/1997 | Baker et al. .................. 173/33 |
| 5,876,233 A | * | 3/1999 | Choudhury et al. ........ 439/368 |
| 5,901,220 A | * | 5/1999 | Carver et al. ............... 379/399 |
| 5,931,703 A | * | 8/1999 | Aekins ........................ 439/676 |
| 5,982,614 A | * | 11/1999 | Reid ............................ 439/52 |
| 6,175,342 B1 | * | 1/2001 | Nicholson et al. ............. 345/1 |
| 6,216,176 B1 | * | 4/2001 | Kadota .......................... 710/1 |
| 6,522,532 B2 | * | 2/2003 | Liao et al. ................... 361/868 |

OTHER PUBLICATIONS

Newton, Harry; Newton's Telecom Dictionary; 2002; CMP Books; 18th edition Merriam–Webster Online Dictionary, www.m–w.com–>"between".*

* cited by examiner

*Primary Examiner*—Jeffrey Gaffin
*Assistant Examiner*—Alan Chen

(57) ABSTRACT

A space-saving technique for ports used in communication between electronic devices. The technique utilizes a common connector structure between adjacent ports to reduce spacing between the adjacent ports. Accordingly, the reduced space requirements may translate to reduced dimensions for the electronic device.

47 Claims, 3 Drawing Sheets

COMPRESSED I/O CONNECTOR LAYOUT WITH SHARED POST

FIELD OF THE INVENTION

The present technique relates generally to the field of computer systems, and more specifically to space saving techniques. The present technique comprises a system and method for configuring ports to minimize the space consumption of the ports.

BACKGROUND OF THE INVENTION

Computer systems (e.g., portable or stationary) generally comprise a plurality of ports for coupling peripheral devices to the computer system. For example, the computer system may have a parallel port for a printer, a serial port for a mouse or keyboard, a ps/2 port for a mouse, a video port for a monitor, a game port for a joystick, a docking port, a universal serial bus ("USB") port, a network port, a modem port, and a variety of other ports for communication, data exchange, and interaction with other devices and users. Many of these ports are standard (e.g., parallel, serial, etc.), while others may be custom designed or tailored to new technology. Some of these ports, particularly the parallel port, consume a considerable amount of space. Accordingly, the space requirements of some ports may create problems for electronic devices having limited space, or for devices that are intended to be compact or portable.

In portable computers (e.g., laptops, notebooks, subnotebooks, palmtops, etc.), it is desirable to maximize functionality and versatility of the computer while minimizing the overall size of the computer. Portable computers and other compact electronic devices generally have a limited number of ports. The number of ports may be based on numerous factors, such as the desired dimensions of the device and the space requirements for the various ports. For example, a notebook computer may simply provide a video port for an external monitor, a parallel port for a printer, and one or more ps/2 or USB ports for input devices such as a keyboard and a mouse. However, if the space requirements for a particular port (e.g., a parallel port) becomes a significant barrier to achieving the desired dimensions of the computer or device, then the port may be eliminated to save space and to achieve the desired dimensions.

Accordingly, a space saving technique is needed to maintain the utility of ports in electronic devices having size constraints. In particular, a technique is needed to reduce the space requirements for ports used in portable and compact electronic devices, such as portable computers and compact electronic devices.

SUMMARY OF THE INVENTION

The present technique is associated with ports for communication between electronic devices. The technique provides a space-saving port configuration, which utilizes a common connector structure between adjacent ports to reduce spacing between the adjacent ports. Accordingly, the reduced space requirements may translate to reduced dimensions for the electronic device.

According to one aspect of the present technique, a port configuration system may be provided for a computing device. The system includes a plurality of ports configured for communication between a plurality of electronic devices, wherein the electronic devices include the computing device and at least one peripheral device. The system also includes a plurality of connectors disposed adjacent the plurality of ports, wherein at least two ports of the plurality of ports share a common connector of the plurality of connectors.

According to another aspect of the present technique, a method may be provided for minimizing space requirements for a plurality of input/output ports for a portable computing device. The method includes the act of disposing first and second ports on the portable computing device, wherein the first and second ports have connector members for coupling with an input/output cable. The method also includes the acts of positioning the first and second ports adjacent one another, and sharing one of the connector members between the first and second ports.

BRIEF DESCRIPTION OF THE DRAWINGS

The invention will hereafter be described with reference to the accompanying drawings, wherein like reference numerals denote like elements, and.

DETAILED DESCRIPTION OF SPECIFIC EMBODIMENTS

The present technique relates to port configurations for reducing space requirements of the ports and for minimizing dimensions of electronic devices hosting the ports. Accordingly, the present technique is applicable to a variety of ports and electronic devices. For example, the technique can be utilized on desktop computers, portable computers (e.g., laptop, notebook, and palmtop computers), peripheral devices, and other computing devices having ports. The ports may comprise a variety of communication and data exchange standards, such as parallel, serial, universal serial bus, video and docking ports.

Figure 1:
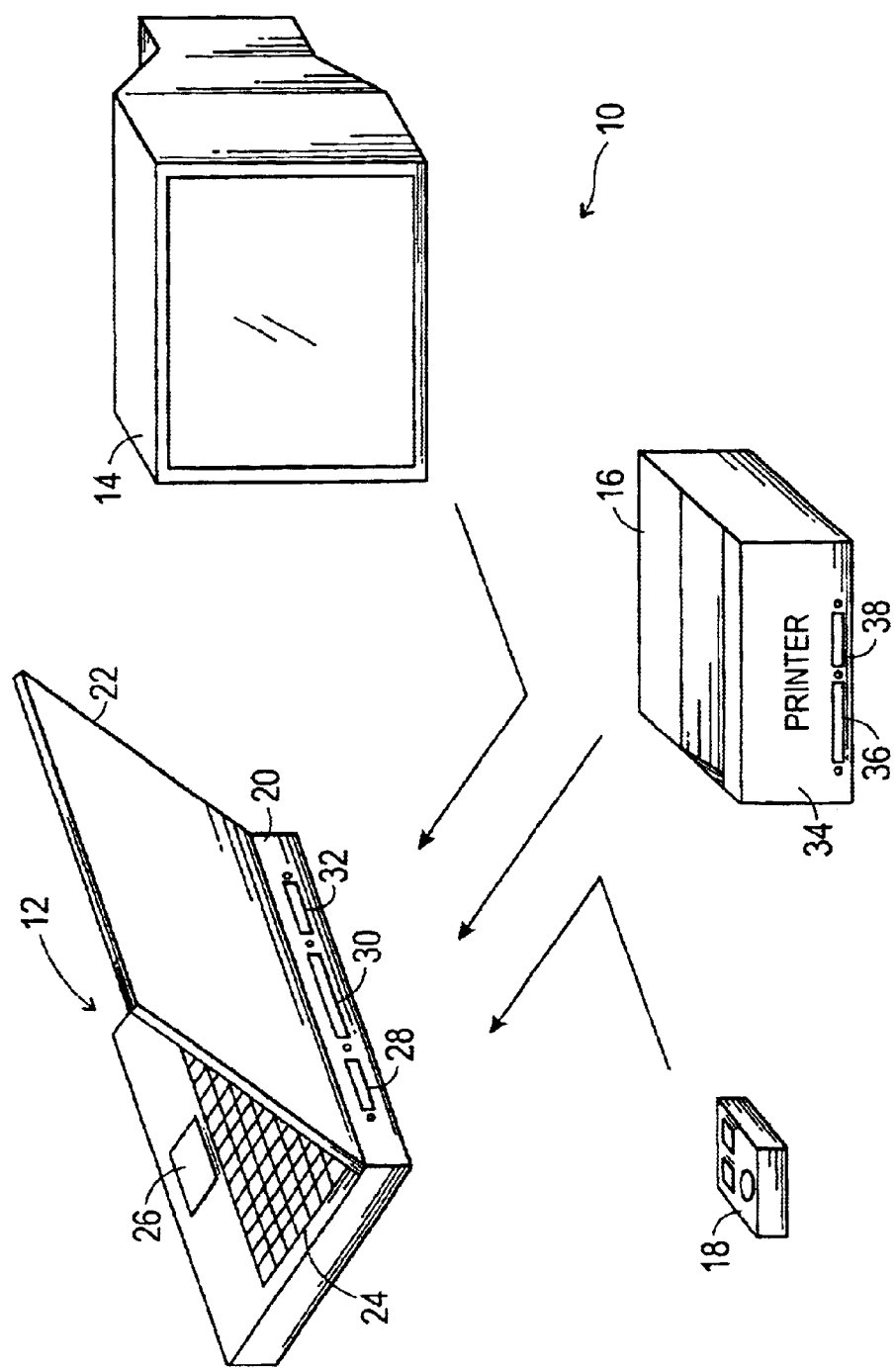
FIG. 1 is a perspective view of a communication system among electronic devices.

FIG. 1 is a perspective view of an exemplary embodiment of the present technique. As illustrated in FIG. 1, the present technique comprises a communication system 10 for a plurality of electronic devices, such as a computing device 12 (e.g., a portable computer), a monitor 14, a printer 16, and a mouse 18. The computing device 12 has a communication panel 20, and also may have a display 22, a keypad 24, and a pointing device 26. The communication panel 20 has plurality of ports, such as ports 28, 30 and 32, for communicating with other electronic devices. For example, the ports 28, 30 and 32 may embody a video port, a parallel port and a serial port for communication with the monitor 14, the printer 16 and the mouse 18, respectively. Also, one or more peripheral devices (e.g., the monitor 14, the printer 16 and the mouse 18) may have a communication panel for communication among the peripheral devices and/or with the computing device 12. For example, the printer 16 may include a communication panel 34 having a plurality of ports, such as port 36 and port 38, which may embody serial and parallel ports.

Figure 2:
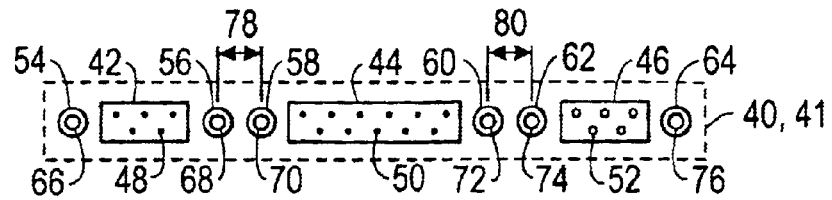
FIG. 2 is a face view of a communication panel having three adjacent communication ports and adjacent connectors in a conventional orientation.

FIG. 2 is a face view of a communication panel 40 having ports and adjacent connectors in a conventional orientation. Although the ports may be custom designed for a particular application, FIG. 2 illustrates the typical spacing between adjacent connectors for the ports. The communication panel 40 can be integrated into an electronic device 41, such as the computing device 12, the monitor 14, the printer 16, the mouse 18, or a plurality of other computing or peripheral devices. As illustrated, the communication panel 40 includes ports 42, 44 and 46, each having a set of conductors (e.g., parallel pins or receptacles) for communicating with other electronic devices. For example, ports 42 and 44 have sets of parallel pins 48 and 50, while the port 46 has a set of parallel receptacles 52. The parallel pins 48 and 50 and parallel receptacles 52 are configured for communicatively coupling the communication panel 40 and the electronic device 41 to a separate electronic device via matching sets of parallel receptacles and pins, respectively. The ports 42, 44 and 46 also have adjacent connectors for mechanically coupling the ports 42, 44 and 46 to the separate electronic devices via cables or other connectors. For example, the port 42 has adjacent connectors 54 and 56, the port 44 has adjacent connectors 58 and 60, and the port 46 has adjacent connectors 62 and 64. As illustrated in FIG. 2, the adjacent connectors 54, 56, 58, 60, 62 and 64 also include threaded receptacles 66, 68, 70, 72, 74 and 76, respectively, for securing a communication cable or other communication connector to the ports.

In the illustrated configuration, each of the ports 42, 44 and 46 and corresponding sets of adjacent connectors are spaced sufficiently to allow a communication connector (e.g., a cable) to be plugged into each of the ports 42, 44 and 46 for simultaneous use of the ports 42, 44 and 46. For example, between the ports 48 and 50, the adjacent connectors 68 and 70 are separated by a distance 78, which is measured from the centers of the respective adjacent connectors 68 and 70. Between the ports 50 and 52, the adjacent connectors 72 and 74 are separated by a distance 80, which is measured from the centers of the respective adjacent connectors 72 and 74. Although the distances 78 and 80 can vary based on the particular ports, the particular electronic device, and other considerations, the present technique eliminates one or more of these distances 78 and 80 by sharing adjacent connectors between adjacent ports.

Figure 3:
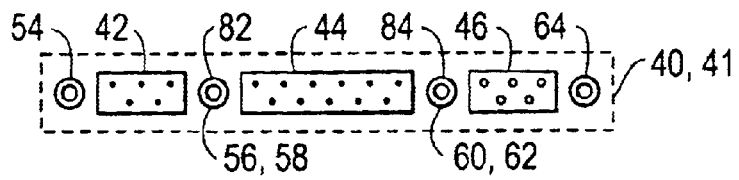
FIG. 3 is a face view of the communication panel having shared connectors between the three adjacent communication ports.

FIG. 3 is a face view of an exemplary embodiment of the present technique having shared connectors. As illustrated, the communication panel 40 has a shared connector 82 disposed between ports 42 and 44 and a shared connector 84 disposed between ports 44 and 46. Referring to FIGS. 2 and 3, the shared connector 82 replaces or combines the adjacent connectors 56 and 58, while the shared connector 84 replaces or combines the adjacent connectors 60 and 62. Accordingly, the illustrated embodiment eliminates the distances 78 and 80, which existed between the adjacent connectors 56 and 58 and the adjacent connectors 60 and 62, respectively. Thus, the present technique reduces the space required for the ports 42, 44 and 46, and also reduces the overall space requirements of the electronic device. The dimensions of the electronic device 41 may be partially or totally dependent on space requirements for the ports 42, 44 and 46. If the dimensions are totally dependent on the port configuration, then a dimension of the electronic device 41 may be reduced by an amount equal to the sum of the distances 78 and 80.

In the illustrated embodiment, the ports 42, 44 and 46 may be utilized simultaneously if one or more of the cables/connectors is configured to share a common threaded member (e.g., a bolt or screw). Otherwise, the use of shared connectors 82 and 84 permits use of any one of the ports 42, 44 and 46, or both of the ports 42 and 46. For example, to facilitate simultaneous use of all of the ports 42, 44 and 46, a communication cable may be provided with one or more tabs having receptacles, each of which are configured for positioning in alignment with one of the threaded receptacles (i.e., 66, 68/70, 72/74 and 76). The communication cable can then be secured to the adjacent connectors (i.e., 54, 56/58, 60/62 and 64) by an adjacent communication cable/connector having threaded members configured for mechanical coupling with the threaded receptacles.

Figure 4:
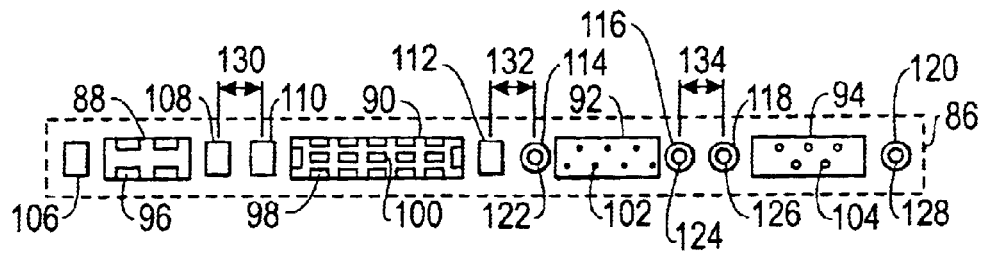
FIG. 4 is a side view of an electronic device having four adjacent communication ports and adjacent connectors in a conventional orientation.

FIG. 4 is a side view of an electronic device 86 having ports and adjacent connectors in a conventional orientation. Although the ports may be custom designed for a particular application, FIG. 4 illustrates the typical spacing between adjacent connectors for the ports. The electronic device 86 may embody the computing device 12, the monitor 14, the printer 16, the mouse 18, or a plurality of other computing or peripheral devices. As illustrated, the electronic device 86 includes ports 88, 90, 92 and 94, each having a set of conductors (e.g., parallel pins or receptacles) for communicating with other electronic devices. For example, the port 88 has leaf spring conductors 96, the port 90 has leaf spring conductors 98 and square pin conductors 100, the port 92 has parallel pin conductors 102, and the port 94 has parallel receptacle conductors 104. The conductors 96, 98, 100, 102 and 104 are configured for communicatively coupling the electronic device 86 to a separate electronic device via matching connectors or plugs, such as a male connector for a female port configuration. The ports 88, 90, 92 and 94 also have adjacent connectors for mechanically coupling the ports 88, 90, 92 and 94 to the separate electronic devices via cables or other connectors. For example, the port 88 has adjacent connectors 106 and 108, the port 90 has adjacent connectors 110 and 112, the port 92 has adjacent connectors 114 and 116, and the port 94 has adjacent connectors 118 and 120. As illustrated in FIG. 4, the adjacent connectors 114, 116, 118 and 120 also include threaded receptacles 122, 124, 126 and 128, respectively, for securing a communication cable or other communication connector to the ports 92 and 94. The adjacent connectors 106, 108, 110 and 112 are quick release, or snap-fit, structures configured for securing the ports 88 and 90 to a communication cable/connector. For example, the adjacent connectors 106, 108, 110 and 112 may embody a snap-fit slot configured to facilitate mechanical coupling with a snap-fit tab disposed on a communication cable.

In the illustrated configuration, each of the ports 88, 90, 92 and 94 and corresponding sets of adjacent connectors are spaced sufficiently to allow a communication connector (e.g., a cable) to be plugged into each of the ports 88, 90, 92 and 94 for simultaneous use of the ports 88, 90, 92 and 94. For example, between the ports 88 and 90, the adjacent connectors 108 and 110 are separated by a distance 130, which is measured from the centers of the respective adjacent connectors 108 and 110. Between the ports 90 and 92, the adjacent connectors 112 and 114 are separated by a distance 132, which is measured from the centers of the respective adjacent connectors 112 and 114. Between the ports 92 and 94, the adjacent connectors 116 and 118 are separated by a distance 134, which is measured from the centers of the respective adjacent connectors 116 and 118. Although the distances 130, 132 and 134 can vary based on the particular ports, the particular electronic device, and other considerations, the present technique eliminates one or more of these distances 130, 132 and 134 by sharing adjacent connectors between adjacent ports.

Figure 5:
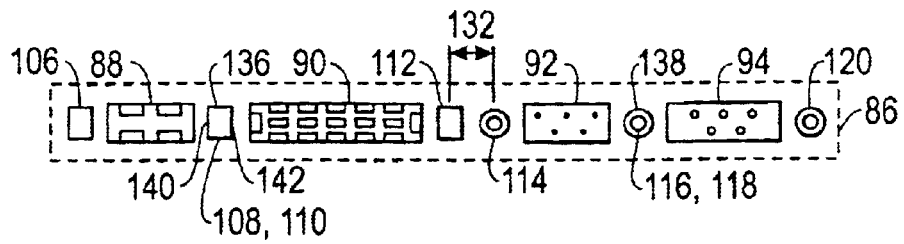
FIG. 5 is a side view of the electronic device having shared connectors between two pairs of the four adjacent communication ports.

FIG. 5 is a side view of the electronic device 86 having shared connectors, according to the present technique. As illustrated, the electronic device 86 has a shared connector 136 disposed between ports 88 and 90 and a shared connector 138 disposed between ports 92 and 94. Referring to FIGS. 4 and 5, the shared connector 136 replaces or combines the adjacent connectors 108 and 110, while the shared connector 138 replaces or combines the adjacent connectors 116 and 118. Accordingly, the illustrated embodiment eliminates the distances 130 and 134, which existed between the adjacent connectors 108 and 110 and the adjacent connectors 116 and 118, respectively. Thus, the present technique reduces the space required for the ports 88, 90, 92 and 94, and also reduces the overall space requirements of the electronic device. The dimensions of the electronic device 86 may be partially or totally dependent on space requirements for the ports 88, 90, 92 and 94. If the dimensions are totally dependent on the port configuration, then a dimension of the electronic device 86 may be reduced by an amount equal to the sum of the distances 130 and 134.

In the illustrated embodiment, the ports 88, 90, 92 and 94 may be utilized simultaneously if one or more of the adjacent connectors 106, 108, 110, 112, 114, 116, 118 and 120 is configured to facilitate simultaneous mechanical coupling with adjacent communication cables. Otherwise, the use of shared connectors 136 and 138 permits use of any one of the ports 88, 90, 92 and 94, or any one of the ports 88 and 90 plus any one of the ports 92 and 94. For example, to facilitate simultaneous use of both of the ports 92 and 94, a communication cable may be provided with one or more tabs having receptacles, each of which are configured for positioning in alignment with one of the threaded receptacles (i.e., 122, 124/126 and 128). The communication cable can then be secured to the adjacent connectors (i.e., 114, 138 and 120) by an adjacent communication cable/connector having threaded members configured for mechanical coupling with the threaded receptacles. A communication cable tabbed in this manner can also be used to facilitate simultaneous use of both of the ports 88 and 90. Moreover, the adjacent connectors 106, 108/110 and 112 can be configured to facilitate snap-fitting on opposite sides 140 and 142 of the shared connector 136 (i.e., adjacent connectors 108 and 110 after being combined). For example, the shared connector 136 may include a snap-fitting slot or tab on each of the opposite sides 140 and 142.

Figure 6:
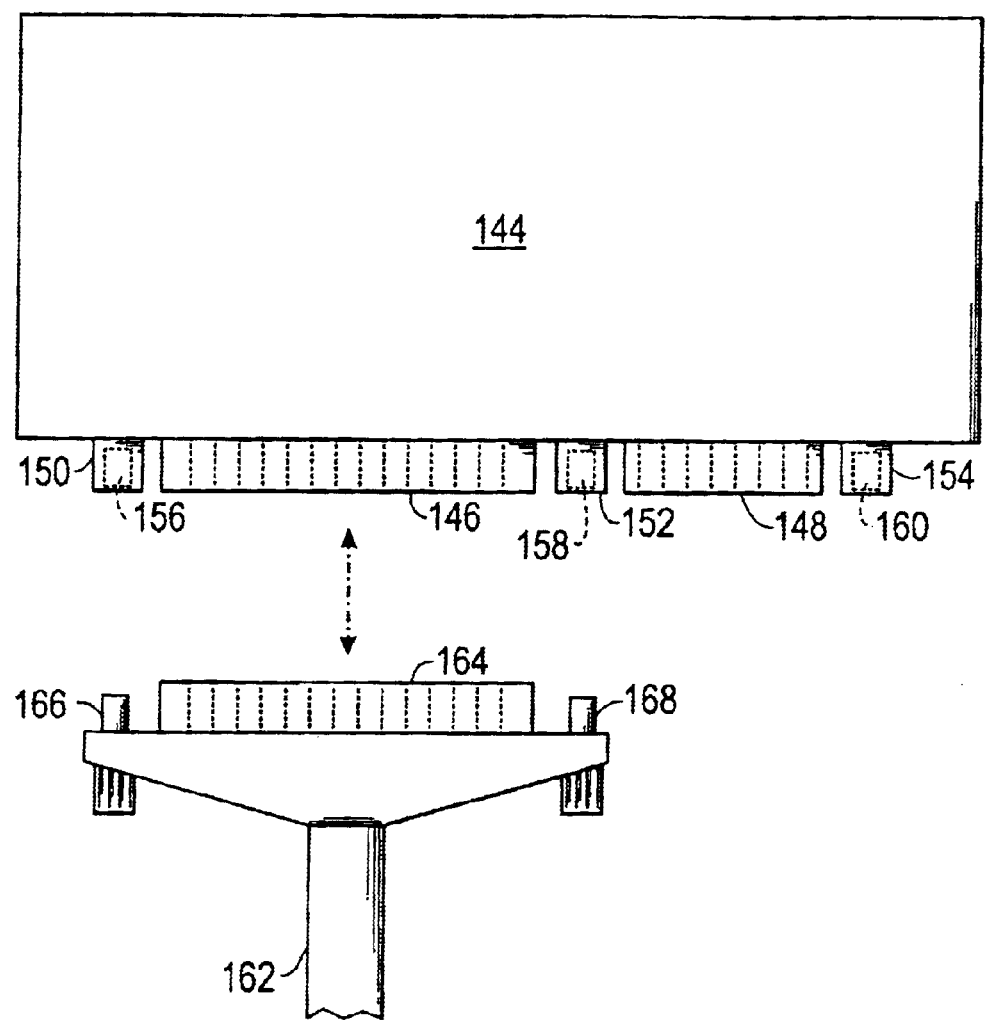
FIG. 6 is a top view of a coupling structure for the present technique.

FIG. 6 is a top view of a second alternate embodiment comprising an electronic device 144 having ports 146 and 148 and mechanical connectors 150, 152 and 154. As illustrated, the ports 146 and 148 share the mechanical connector 152, while the port 146 has the mechanical connector 150 disposed opposite the mechanical connector 152 and the port 148 has the mechanical connector 154 disposed opposite the mechanical connector 152. In the illustrated embodiment, the mechanical connectors 150, 152 and 154 also include threaded receptacles 156, 158 and 160 for mechanically coupling the ports to a separate electronic device via a cable (e.g., a cable 162). The cable 162 includes a plug 164, which is configured for mating with the port 146, and threaded members 166 and 168, which are configured to be aligned with, and threaded into, the threaded receptacles 156 and 158, respectively. Alternatively, a cable may be provided for coupling with the port 148.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of electronic systems having multiple communication ports. The ports also may have various communication protocols, either custom or standard, and various structures for mechanically coupling the ports to cables, connectors or directly to other electronic devices. Accordingly, the invention is intended to cover all modifications, equivalents, and alternatives falling within the spirit and scope of the invention as defined by the following appended claims.

What is claimed is:

1. A port configuration system for a computing device, comprising:

a plurality of ports configured for communication between a plurality of electronic devices comprising the computing device and at least one peripheral device;

a plurality of connectors disposed adjacent the plurality of ports, wherein at least two ports of the plurality of ports share a common connector of the plurality of connectors, wherein the common connector is configured for mutually exclusive use by one port of the at least two ports for coupling the one port to a desired electronic device.

2. The system of claim 1, wherein the at least two ports are externally disposed on the computing device.

3. The system of claim 1, wherein the at least two ports are disposed on a portable computing device.

4. The system of claim 3, wherein the portable computing device comprises a laptop computer.

5. The system of claim 3, wherein the portable device comprises a palmtop computer.

6. The system of claim 1, wherein the at least two ports are disposed on the peripheral device.

7. The system of claim 6, wherein the peripheral device comprises a portable memory device.

8. The system of claim 1, wherein at least one of the plurality of ports comprises a plurality of parallel pins.

9. The system of claim 1, wherein the plurality of ports comprise a serial port.

10. The system of claim 1, wherein the plurality of ports comprise a parallel port.

11. The system of claim 1, wherein the plurality of ports comprise a midi/game port.

12. The system of claim 1, wherein the plurality of ports comprise a monitor port.

13. The system of claim 1, wherein the plurality of ports comprise a docking port.

14. The system of claim 1, wherein each of the at least two parts has two of the connectors, one of which is the common connector.

15. The system of claim 1, wherein the plurality of connectors comprise threaded receptacles configured to receive screw members adjacent a communication cable.

16. A space reduction system for a plurality of communication ports for a portable computing device, comprising:

a communication panel for the portable computing device;

a plurality of ports disposed on the communication panel, wherein at least two ports of the plurality of ports are disposed adjacent one another; and a plurality of connectors disposed on the communication panel adjacent the plurality of ports, wherein the at least two ports share a common connector of the plurality of connectors and wherein the at least two ports comprise first and second port types configured for mutually exclusive communication with an external device via a communication connector adapted to one of the first and second port types.

17. The system of claim 16, wherein the communication panel is disposed on an exterior side of the portable computing device.

18. The system of claim 17, wherein the portable computing device comprises a laptop computer.

19. The system of claim 17, wherein the portable computing device comprises a notebook computer.

20. The system of claim 17, wherein the portable computing device comprises a handheld computing device.

21. The system of claim 16, wherein at least one of the plurality of ports comprises a plurality of parallel conductors configured for coupling with a communication cable via a plug at an end of the communication cable.

22. The system of claim 16, wherein at least one of the plurality of ports comprises a serial port.

23. The system of claim 16, wherein at least one of the plurality of ports comprises a parallel port.

24. The system of claim 16, wherein at least one of the plurality of ports comprises a video port.

25. The system of claim 16, wherein each of the at least two parts has two of the connectors, one of which is the common connector.

26. A system for conserving space, comprising:
a portable computing device having:
a first communication port externally disposed on the portable computing device;
a second communication port externally disposed on the portable, computing device adjacent to the first communication port, wherein the first and second communication ports comprise first and second port types configured for mutually exclusive communication with external device via a communication connector adapted to one of e first and second port types; and
a common connector disposed on the portable computing device between the first and second communication ports.

27. The system of claim 26, wherein the portable computing device comprises one of a laptop computer, a notebook computer, and a subnotebook computer.

28. The system of claim 27, wherein the first and second port types comprise two different port types from of plurality of port types comprising a serial port, a parallel port, a video port, a midi/game port, and a docking port.

29. The system of claim 26, wherein the portable computing device comprises a handheld computing device.

30. The system of claim 26, wherein each of the first and second ports has two adjacent connectors disposed on the portable computing device, one of the two adjacent connectors being the common connector.

31. A method of configuring ports for communication between electronic devices, comprising:
disposing a plurality of communication ports on a first electronic device;
locating a plurality of connectors on the first electronic device adjacent the plurality of communication ports;
positioning the plurality of communication ports adjacent one another; and
deploying a single connector of the plurality of connectors between the plurality of communication ports for sharing among the plurality of communication ports, wherein the single connector is configured for mutually exclusive use by one of the plurality of communication ports.

32. The method of claim 31, wherein disposing comprises disposing the plurality of communication ports on a stationary computing apparatus.

33. The method of claim 31, wherein disposing the first electronic device comprises disposing the plurality of communication ports on a portable computing apparatus.

34. The method of claim 31, wherein disposing the plurality of communication ports comprises disposing at least one port having a plurality of parallel conductor pins on the first electronic device.

35. The method of claim 31, comprising forming threaded receptacles in at least one of the plurality of connectors for mating with screw members of a communication linkage.

36. The method of claim 31, wherein positioning the single connector comprises eliminating a number of connectors, the number being equal to one less than the plurality of communication ports.

37. The method of claim 31, wherein positioning the single connector comprises reducing spacing between the plurality of communication ports.

38. The method of claim 37, wherein reducing spacing between the plurality of communication ports comprises reducing a dimension of the computing device.

39. The method of claim 37, wherein reducing spacing between the plurality of communication ports comprises reducing a dimension of a circuit board for the computing device.

40. A method of minimizing space requirements for a plurality of input/output ports for a portable computing device, comprising:
disposing first and second ports on the portable computing device, wherein the first and second ports have connector members for coupling with an input/output cable;
positioning the first and second ports adjacent one another; and
sharing one member of the connector members between the first and second ports, wherein the one member is configured for mutually exclusive use by either the first port or the second port.

41. The method of claim 40, wherein disposing comprises disposing the first and second ports on a handheld computer.

42. The method of claim 40, wherein disposing comprises disposing the first and second ports on a laptop computer.

43. The system of claim 40, wherein disposing the first and second ports comprises disposing a serial port on the portable computing device.

44. The system of claim 40, wherein disposing the first and second ports comprises disposing a parallel port on the portable computing device.

45. The method of claim 40, wherein sharing comprises eliminating one of the connector members.

46. The method of claim 40, wherein sharing comprises reducing spacing between the first and second ports.

47. The method of claim 46, wherein reducing spacing between the first and second ports comprises reducing a dimension of the first electronic device.

* * * * *

UNITED STATES PATENT AND TRADEMARK OFFICE
CERTIFICATE OF CORRECTION

PATENT NO. : 6,884,098 B2
APPLICATION NO. : 09/818284
DATED : April 26, 2005
INVENTOR(S) : Steven S. Homer et al.

It is certified that error appears in the above-identified patent and that said Letters Patent is hereby corrected as shown below:

IN THE CLAIMS

Claim 5, Column 6, line 34, after "portable" insert --computing--

Claim 25, Column 7, line 27, delete "parts" and insert therefor --ports--

Claim 26, Column 7, line 34, after "portable" delete ","

Claim 26, Column 7, line 38, after "with" insert --an--

Claim 26, Column 7, line 39, delete "e" and insert therefor --the--

Signed and Sealed this

Twenty-eighth Day of July, 2009

JOHN DOLL
*Acting Director of the United States Patent and Trademark Office*